US 8,682,286 B2

(12) United States Patent
Dickinson et al.

(10) Patent No.: US 8,682,286 B2
(45) Date of Patent: *Mar. 25, 2014

(54) ENHANCED E911 NETWORK ACCESS FOR A CALL CENTER USING SESSION INITIATION PROTOCOL (SIP) MESSAGING

(71) Applicants: Richard Dickinson, Seattle, WA (US); John Gordon Hines, Kirkland, WA (US); Jonathan Croy, Seattle, VT (US)

(72) Inventors: Richard Dickinson, Seattle, WA (US); John Gordon Hines, Kirkland, WA (US); Jonathan Croy, Seattle, VT (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,721

(22) Filed: Feb. 4, 2013

(65) Prior Publication Data

US 2013/0149988 A1 Jun. 13, 2013

Related U.S. Application Data

(63) Continuation of application No. 13/437,538, filed on Apr. 2, 2012, now Pat. No. 8,369,825, which is a continuation of application No. 12/588,332, filed on Oct. 13, 2009, now Pat. No. 8,150,364, which is a continuation of application No. 11/581,454, filed on Oct. 17, 2006, now abandoned, application No. 13/758,721, filed on Feb. 4, 2013, which is a continuation-in-part of application No. 11/150,343, filed on Jun. 13, 2005, now Pat. No. 7,903,791, which is a continuation of application No. 10/739,292, filed on Dec. 19, 2003, now Pat. No. 6,940,950.

(51) Int. Cl.
*H04M 11/04* (2006.01)

(52) U.S. Cl.
USPC .............. 455/404.2; 455/404.1; 455/414.4; 455/445; 379/45; 370/352

(58) Field of Classification Search
USPC .................... 455/426.1, 426.2, 445, 428, 455/404.1–404.2; 370/338, 352; 379/37, 379/38, 45, 46
See application file for complete search history.

(56) References Cited

U.S. PATENT DOCUMENTS

| | | | |
|---|---|---|---|
| 6,674,403 B2 | 1/2004 | Gray | |
| 6,940,950 B2 * | 9/2005 | Dickinson et al. | 379/45 |
| 7,783,013 B2 * | 8/2010 | Laliberte | 379/37 |
| 8,059,631 B2 * | 11/2011 | Anto Emmanuel | 370/352 |
| 8,116,723 B2 * | 2/2012 | Kaltsukis | 455/404.2 |
| 8,150,363 B2 * | 4/2012 | Dickinson et al. | 455/404.1 |
| 8,195,121 B2 * | 6/2012 | Dunn et al. | 455/404.1 |
| 8,254,529 B2 * | 8/2012 | Oldham et al. | 379/45 |
| 8,269,607 B2 * | 9/2012 | Ciesla et al. | 340/10.1 |

(Continued)

*Primary Examiner* — Sharad Rampuria
(74) *Attorney, Agent, or Firm* — William H. Bollman

(57) ABSTRACT

A switched emergency call (e.g., a 911 call, an alarm company call) forwarded by a telematics call center is converted into a session initiation protocol (SIP) packetized phone call at the call center, and routed over an IP network, for presentation to an emergency services gateway, which connects to a selective router via dedicated circuits, gaining full access to the Enhanced 911 network. This provides a PSAP receiving a call from a telematics call center or other call center with all features available in an Enhanced 911 network, e.g., callback number of the 911 caller, and location of the 911 caller. Location of the caller is provided using a VoIP positioning center (VPC), queried from the call center. In this way, the switched emergency call is converted into a SIP packetized phone call and routed without further passage through the public switched telephone network (PSTN).

14 Claims, 5 Drawing Sheets

(56) References Cited

U.S. PATENT DOCUMENTS

| | | | |
|---|---|---|---|
| 8,396,449 B2* | 3/2013 | Hatton | 455/404.1 |
| 8,554,168 B1* | 10/2013 | Bonner et al. | 455/404.1 |
| 2004/0166809 A1 | 8/2004 | Dickey | |
| 2004/0203634 A1* | 10/2004 | Wang et al. | 455/414.1 |
| 2007/0003024 A1* | 1/2007 | Olivier et al. | 379/45 |
| 2007/0121601 A1* | 5/2007 | Kikinis et al. | 370/356 |
| 2008/0304631 A1* | 12/2008 | Vilis et al. | 379/45 |
| 2009/0004997 A1* | 1/2009 | Allen et al. | 455/404.1 |
| 2009/0186596 A1* | 7/2009 | Kaltsukis | 455/404.2 |

* cited by examiner

ENHANCED E911 NETWORK ACCESS FOR A CALL CENTER USING SESSION INITIATION PROTOCOL (SIP) MESSAGING

This application is a continuation of U.S. application Ser. No. 13/437,538, entitled "ENHANCED E911 NETWORK ACCESS FOR A CALL CENTER USING SESSION INITIATION PROTOCOL (SIP) MESSAGING," to Dickinson et al., filed Apr. 2, 2012, now U.S. Pat. No. 8,369,825; which in turn is a continuation of U.S. application Ser. No. 12/588,332, entitled "ENHANCED E911 NETWORK ACCESS FOR A CALL CENTER USING SESSION INITIATION PROTOCOL (SIP) MESSAGING," to Dickinson et al., filed Oct. 13, 2009, now U.S. Pat. No. 8,150,364; which in turn is a continuation of U.S. application Ser. No. 11/581,454, entitled "ENHANCED E911 NETWORK ACCESS FOR A CALL CENTER USING SESSION INITIATION PROTOCOL (SIP) MESSAGING," to Dickinson et al., filed Oct. 17, 2006, now abandoned, the entirety of both of which are expressly incorporated herein by reference. The present application also is a continuation-in-part of U.S. patent application Ser. No. 11/150,343, entitled "ENHANCED E911 LOCATION INFORMATION USING VOICE OVER INTERNET PROTOCOL (VoIP)", filed Jun. 13, 2005, now U.S. Pat. No. 7,903,791, which in turn claims priority from U.S. patent application Ser. No. 10/739,292, entitled "ENHANCED E911 LOCATION INFORMATION USING VOICE OVER INTERNET PROTOCOL (VoIP)," filed on Dec. 19, 2003, now U.S. Pat. No. 6,940,950.

BACKGROUND OF THE INVENTION

1. Field of the Invention

This invention relates generally to E9-1-1 emergency phone calls. More particularly, it relates to emergency E9-1-1 calls using Voice Over Internet Protocol (VoIP), originating from centralized call centers.

2. Background of the Related Art 911 is a phone number legislated into law as a designated universal emergency phone number used by callers to access emergency response services. Enhanced 911 (E911) is defined by the transmission of callback number and location information to the relevant public safety answering point (PSAP). A PSAP is the endpoint of an emergency services call. PSAPs are responsible for answering emergency services calls. E911 may be implemented for landline, VoIP, and/or mobile devices. Some Public Safety Access Points (PSAPs) are not enhanced, and thus do not receive the callback or location information from any phone, landline or mobile.

Many cars built today include a telematics system. The word "telematics", in its broadest sense, relates to the combination of computers and wireless telecommunications technologies. More recently, the term "telematics" has evolved to refer to automobile systems that combine global positioning satellite (GPS) tracking and other wireless communications for automatic roadside assistance and remote diagnostics. General Motors Corp. first popularized automotive telematics with its OnStar™ system. Mercedes-Benz offers a similar system called TeleAid™. The use of the word "telematics" throughout the current specification is intended to refer to the later definition of more recent recognition, i.e., to mean automotive telematics.

Many new vehicles are equipped with wireless-based telematics units providing services controlled by voice commands. One successful telematics system is available from OnStar Corp. (www.onstar.com). According to OnStar, OnStar brings together emergency service providers, wireless telephone, and satellite technologies to help protect a driver, and keep them connected on the road.

As part of the telematics system, a telematics unit including a cellular telephone circuit is located within the vehicle, and powered by the vehicle's battery. Telematics units were originally analog-only, but have migrated to analog/digital-ready, and finally to dual-mode analog/digital. Dual-mode analog/digital telematics units operate on both the analog and digital wireless networks.

With a suitable subscription for the use of a telematics operations center such as OnStar, a driver or passenger in a vehicle including a telematics unit has access to a voice-activated calling feature in their vehicle, just in case their hand-held cell phone is lost, forgotten or has a low battery. They can pre-purchase OnStar Hands-Free Calling minutes to use on the road. Such packages are typically billed to a credit card they keep on file with OnStar. They can order minutes packages by pushing the phone or white-dot button at any time.

Conventional telematics units are also capable of providing location information to a requesting wireless network, using a Global Positioning Satellite (GPS) mounted in the vehicle, or using other location technology within the wireless network. When a vehicle occupant pushes a given button in the vehicle, essentially calling the telematics operations center, the action initiates the location-determining technology which then transmits vehicle location to the telematics operations center. Moreover, if their air bag deploys, the location of the vehicle can be automatically reported to the telematics operations center. So it's only when the button is pushed to contact the telematics operations center, or when the telematics operations center is responding to an emergency signal, that the telematics operations center is provided with a location of the vehicle.

Today, most telematics companies and more generally alarm companies monitor signals from customers' car, home or business. The monitoring is usually centralized in a single location for customer locations across the country (e.g., a station in Columbus, Ohio might monitor homes throughout the country for a given monitoring company. In more global companies, an alarm or other monitoring company might monitor alarm signals from homes in the United States from a centralized command center located in Bombay, India.

Thus, in today's global economy, when a customer places an emergency call such as a 911 call (or automated alarm system emergency call), the call may be routed very far away, and in some instances half-way across the world. The telematics operator must then transfer the 911 call to the relevant 911 center (public safety access point (PSAP)). However, this transfer must take place over the Public Switched Telephone Network (PSTN) because such transfer, cannot conventionally be gained to the PSAP's existing Enhanced 911 (E911) dedicated network. Moreover, note that even the call related information (e.g., CallerID) provided with the call would relate to the identity and location of the centralized telematics center—not to the callback number and certainly not the location of the customer originally dialing 911.

FIG. 3 shows conventional relevant systems in an emergency 911 call made via a telematics call center.

In particular, as shown in FIG. 3, a telematics unit 101 within a car dials 911. The 911 call is serviced by a cell site of a service provider, which includes a given mobile servicing center (MSC) 102. The MSC 102 passes the 911 call on to its relevant telematics call center 104 via the PSTN. The telematics call center 104 may be, e.g., an ONSTAR™ call center.

The operator at the telematics call center 104 that handles the 911 call of its own subscriber obtains the identity and location information of the 911 caller. Based on the current location of the 911 caller, the operator performs a query of a telematics PSAP database 106 to determine a unique 10-digit phone number of the proper local PSAP physically responsible for the location of the 911 caller. The telematics PSAP database 106 is essentially the equivalent of an Emergency Routing Data Base (ERDB).

The operator at the telematics call center 104 then forwards the 911 caller to the PSAP by dialing its 10-digit phone number via the public switched telephone network (PSTN) 110.

Unfortunately, calls that arrive at the PSAP in this manner do not include call-back number (Automatic Number Identification (ANI)) and location information (Automatic Location Identification (ALI)). Moreover, the PSTN telephone 302 at the PSAP 118 is typically not answered with the same priority as are calls that originate on its E911 network. In addition, these calls are typically not recorded or time-stamped by PSAP equipment as are calls that arrive via the E911 network.

Trials have been conducted in which a local exchange carrier (LEC) has permitted access to a selective router for the E911 network via the PSTN. In this trial, the LEC designated a specific 10-digit telephone number for each specific PSAP. A caller has their emergency call transferred to this 10-digit telephone number, which is then call-forwarded within the central office to the selective router, which then forwards the call to the correct PSAP based upon the digits dialed. However, this solution suffers from various security issues and has not found favor in the LEC industry or within the PSAP community.

Other conventional technology relies on the PSAP having separate, second set of phone equipment capable of receiving proprietary data from the telematics center 104. But this solution would be prohibitively costly to implement nationwide for each telematics center, not to mention take up valuable space inside a PSAP center. Thus, the costs and disruption caused by the need for new hardware makes this a rather undesirable solution.

There is the need for a simple and effective solution to providing easy and full access to the Enhanced 911 network of an emergency services provider (e.g., PSAP) from users of a centralized call center, e.g, telematics call center, alarm call center, etc.

SUMMARY OF THE INVENTION

In accordance with the principles of the present invention, a method and apparatus for providing a call center with access to an Enhanced 911 network supporting a public safety answering point (PSAP) comprises determining a unique PSAP having jurisdictional responsibility for a physical current location of a caller to the call center. The caller is forwarded via a switched telephone network to a VoIP call server. The switched telephone call is converted into a session initiation protocol (SIP) packetized phone call at the call center. A VoIP positioning center is queried for call routing instructions for the SIP packetized phone call. The SIP packetized phone call is routed to an emergency services gateway without further passage through the public switched telephone network (PSTN).

DETAILED DESCRIPTION OF ILLUSTRATIVE EMBODIMENTS

In a first embodiment, an emergency call (e.g., 911 call, alarm company call) forwarded by a telematics call center is routed over the switched PSTN to a Voice Over Internet Protocol (VoIP) call server, where the switched call is converted to a packetized IP call for presentation to an emergency services gateway, gaining access to the Enhanced 911 network. Location of the caller is determined by GPS or other technology in the vehicle or in the wireless network, and is reported to the telematics call center. The telematics center's call back number is provided to the VoIP Positioning Center (VPC) via standard call set-up procedures across the PSTN to the call server, and then from the call server to the VPC. The caller's location may be provided to the VPC via non-call path data links to the telematics call center. The VPC will stage the call-back and location data for subsequent transmission to the PSAP via the ALI database.

In a later embodiment, SIP messaging is used in lieu of the PSTN for passing an E911 call from a call center. If a telematics call center has VoIP capability, the PSTN may be avoided by routing telematics E911 calls directly via VoIP between the call center and the VPC.

In a last embodiment, wireless emergency services routing keys (ESRKs) are used to route emergency calls to a telematics call center over a Voice Over IP (VoIP) network to an enhanced E911 network of a public service access point (PSAP).

Voice Over IP (VoIP) is a technology that has been developed as an alternative telephony technology to the conventional telephony service (e.g. PSTN). VoIP takes advantage of high speed Internet data packet networks, and is able to provide low cost telephony services to end users. VoIP technology emulates a phone call, but instead of using a circuit based system such as the telephone network, utilizes packetized data transmission techniques most notably implemented in the Internet.

VoIP phone calls are routed to a VoIP voice gateway, from which they are passed on to their destination VoIP device. Conventional VoIP voice gateways (i.e., soft switches) are typically located in only a few places across the country. A soft switch is a programmable network switch that can process the signaling for all types of packet protocols. Also known as a 'media gateway controller,' 'call agent,' or 'call server,' such devices are used by carriers that support converged communications services by integrating SS7 telephone signaling with packet networks. Softswitches can support, e.g., IP, DSL, ATM and frame relay.

Because VoIP is Internet Protocol (IP) based, call related information such as CallerID type services may not be available or accurate. A location of a given VoIP device may be provisioned to be at a given geographic location, or queried from a home location register (HLR) in a mobile system.

Figure 1:
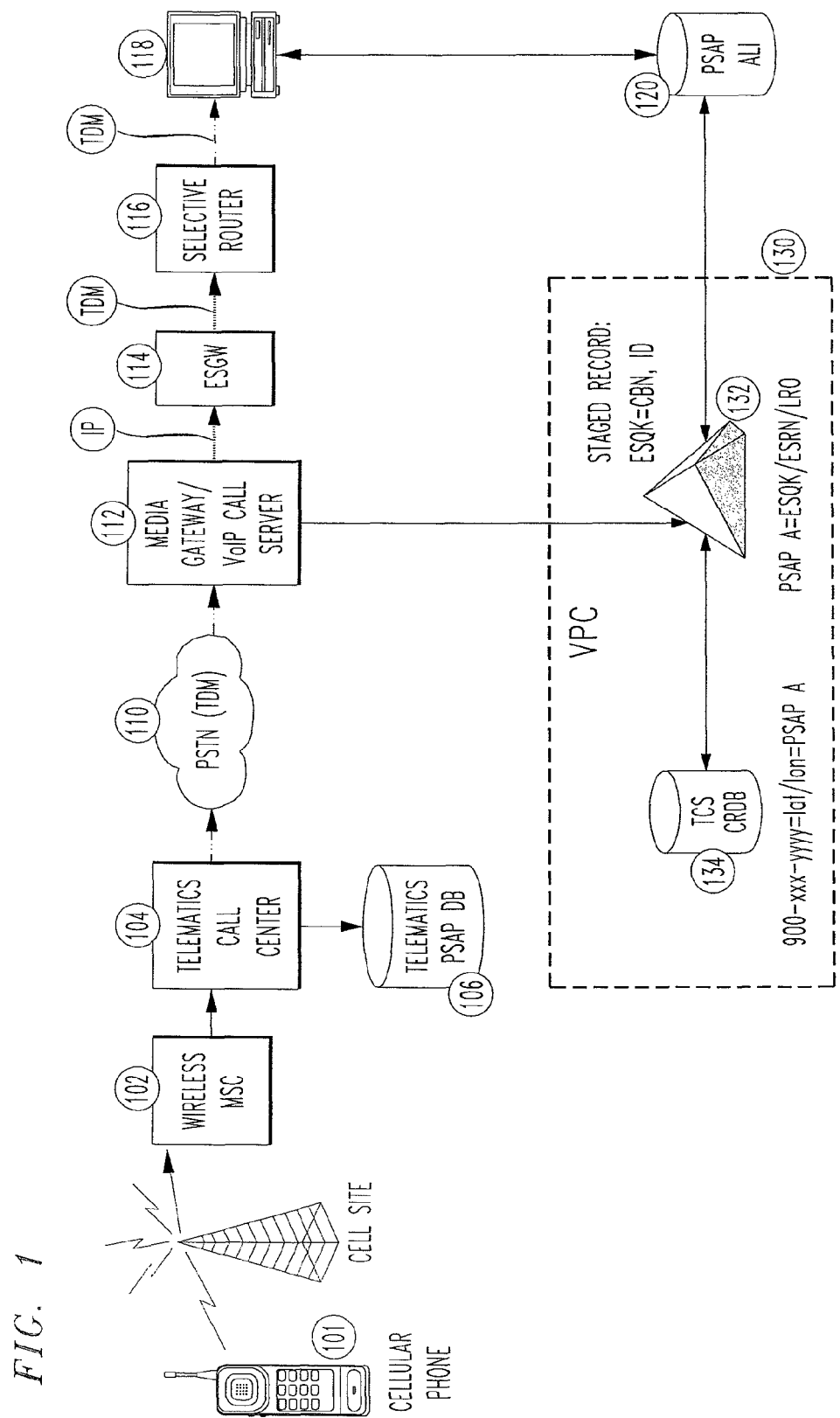
FIG. 1 shows an exemplary E911 architecture including E911 network access provided to a telematics call center or other call center, in accordance with the principles of the present invention.

FIG. 1 shows an exemplary E911 architecture including E911 network access provided to a telematics call center or other call center, in accordance with the principles of the present invention.

The present invention applies the switched telephone connectivity of the PSTN to route calls to a media gateway/VoIP call server 112. The switched call is converted into a packetized call using Internet Protocol (IP), and is routed via the internet to the ESGW 114 closest to the appropriate selective router for the destination PSAP. The ESGW converts the packetized IP data back into traditional TDM, and routes the call to the intended selective router 116 via dedicated TDM trunks, where it enters the E911 network. A selective router is the node in an emergency services network that performs enhanced call routing for 911 calls.

An example will be used to further illustrate the inventive architecture. In this example, a telematics unit 101 within a car dials 911. The 911 call is serviced by a cell site of a service provider, which includes a given mobile servicing center (MSC) 102. The MSC 102 forwards the 911 call on to its relevant telematics call center 104 via the PSTN. The telematics call center 104 may be, e.g., an ONSTAR™ call center, and may be located anywhere in the country or anywhere in the world.

The operator at the telematics call center 104 that handles the 911 call of its own subscriber obtains the nature of the call, as well as the identity and location of the 911 caller. The identity and location of the 911 call from the subscriber is most often received by the call center 104 over the open phone line to their subscriber. Equipment to receive the exact location of the subscriber is expensive, but necessary only at the centralized telematics call center. The thousands of PSAPs in the country do not have the same equipment, as it would be prohibitively expensive.

Based on the current location of the 911 caller, the operator performs a query of a telematics PSAP database 106 to determine a local PSAP physically responsible for that location, as well as a unique 10-digit phone number to access the Enhanced 911 network of that PSAP.

The operator at the telematics call center 104 handling the 911 call forwards the emergency call to a given media gateway/VoIP call server 112 via the PSTN by dialing the designated 10-digit number for that PSAP To determine the appropriate PSAP and ESGW, the VoIP call server 112 queries a VoIP positioning center (VPC) 130. Using the 10-digit phone number dialed by the call center operator 104, the VPC queries the database 134 to determine the corresponding PSAP. The VPC then assigns an Emergency Services Query Key (ESQK) to the call and relays this routing key back to the VoIP Call Server 112.

The VoIP call server 112 passes the 911 emergency call on to an emergency service gateway (ESGW) 114, which in turn passes the 911 emergency call on to the desired PSAP 118. An ESGW resides in a VoIP service provider's network, and is responsible for integrating the session initiation protocol (SIP) network with the emergency services network (TDM). An ESGW 114 network includes dedicated voice trunks to selective routers in the Enhanced 911 (E911) network for any/all PSAPs being served (ideally a national network). The ESGW 114 routes 911 calls to the appropriate selective router, based on the ESRN/ESQK it receives.

The selective router 116 is provisioned with emergency services query keys (ESQKs) with ALI steering. (The ESQK is a digit string that uniquely identifies an ongoing emergency services call and is used to correlate the emergency services call with the associated data messages. It may also identify an emergency services zone and may be used to route the call through the network. The ESQK is similar to an ESRK in wireless E911 networks.)

A subscriber location database (SLDB) 134 is also provisioned. Preferably the SLDB 134 is configured so that no modifications are required to the core conventional existing VoIP E9-1-1 network. The SLDB 134 is used to relate a Session Initiation Protocol (SIP) Universal Resource Identifier (URI) or a telephone number to a PSAP.

In the given embodiments the SLDB 134 includes a listing of a series of "subscribers", in which each subscriber is really a specific PSAP with a designated 1-900-xxx-yyyy phone number. Note that the phone number does not need to be a 1-900 number as this is used as an example only. This is also a useful technique for billing the call center for this service.

In the disclosed embodiments, the address of this "subscriber" is the latitude/longitude (lat/lon) of a centroid of the jurisdiction of the relevant PSAP. Alternatively, in databases that use tables in lieu of GIS for routing determination, the address of the "subscriber" can be any valid address within the jurisdiction of the PSAP.

Figure 2:
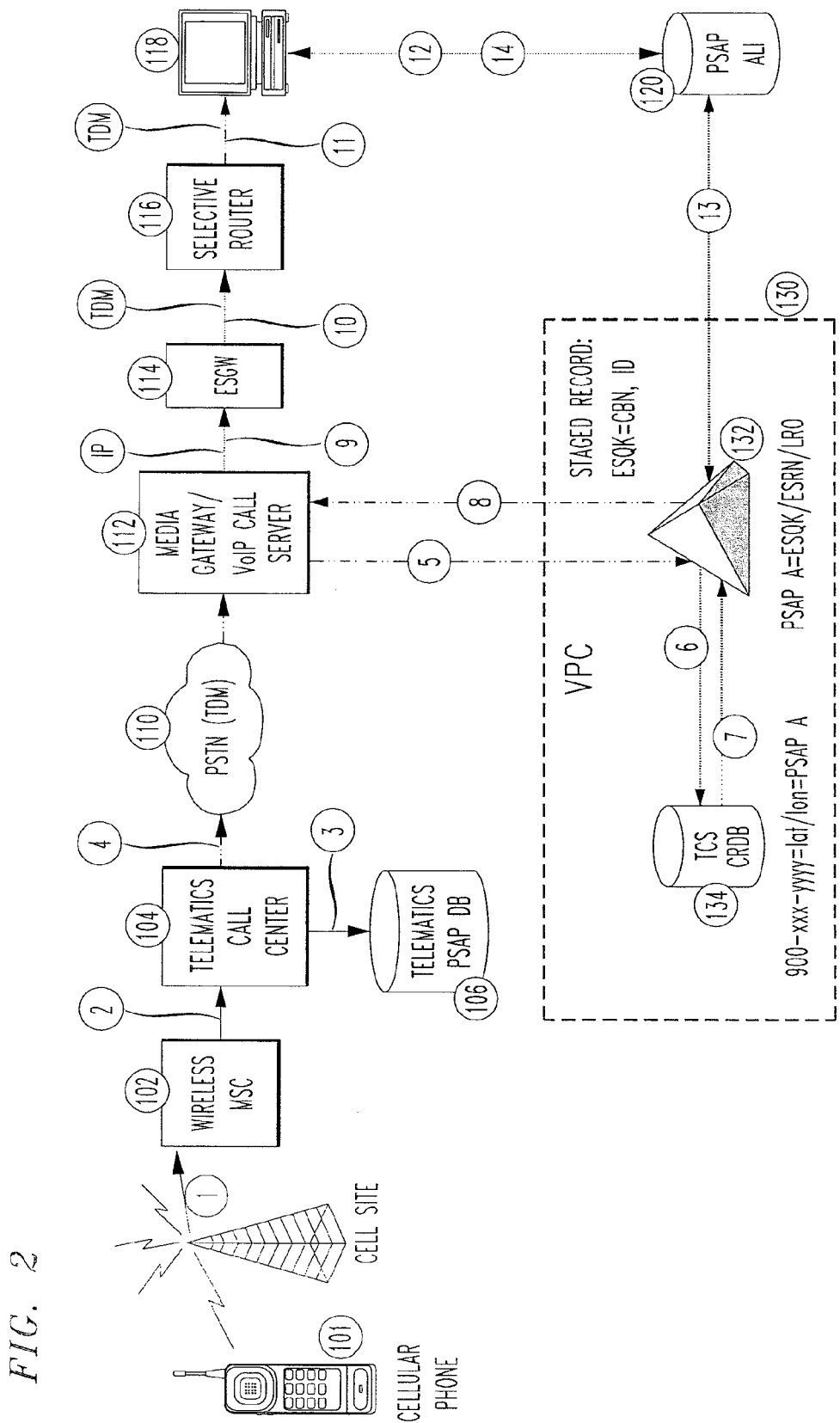
FIG. 2 shows an exemplary call flow tracing an emergency 911 call from a telematics subscriber source to the appropriate PSAP, in accordance with the principles of the present invention.
Figure 3:
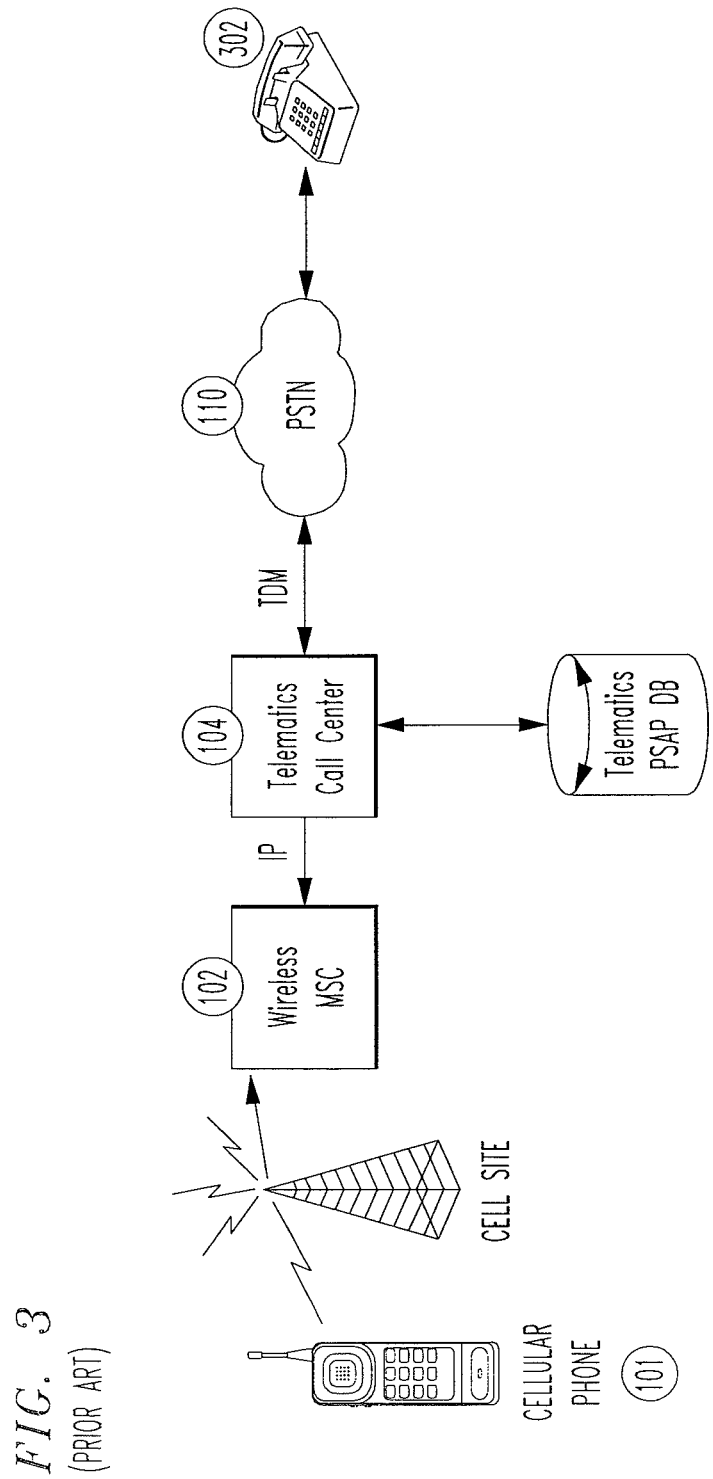
FIG. 3 shows conventional relevant systems in an emergency 911 call made via a telematics call center.

FIG. 2 shows an exemplary call flow tracing an emergency 911 call from a telematics subscriber source to the appropriate PSAP, in accordance with the principles of the present invention.

In particular, as shown in FIG. 2, a caller or automated calling device 101 contacts a local security monitoring company or roadside assistance operator or similar third party call center 104. As an example shown in step 1, a caller 101 dials 911, which is serviced through a wireless MSC 102 and passed on to the relevant telematics call center, e.g., an OnSTAR™ call center. In the given example, the wireless MSC 102 may be part of a wireless carrier's network, with the 911 call being forwarded to the relevant telematics call center 104. Alternatively, the MSC 102 may be part of a large wireless network used by the telematics company itself.

The 911 call may be placed using an SOS or similar single-press button located in a car for use in emergency situations, automatically in the event of an accident, etc. Alternatively, the phone user may simply dial 911 in a manual cell phone call from a mobile phone, either integrated into a vehicle or entirely separate from a vehicle.

In step 2, a wireless MSC 102 routes the incoming emergency call to a telematics call center 104 (e.g., an ONSTAR™ or TeleAid™ call center). In the given example this routing includes use of the PSTN 110, though this need not be the case in all applications.

The call taker at the call center 104 who receives the 911 call from the caller 101 determines that this is an emergency call that must be referred to the local 911 PSAP.

Thus, in step 3, the telematics call taker queries an existing telematics PSAP database 106 to determine the correct PSAP to which the call should be routed. Of course, to save time step 3 may be performed simultaneous with, or even prior to, the call taker's determination that the call from the mobile user 101 is an emergency call.

In step 4, a telematics dispatcher dials (could be the same person and/or equipment as the call taker) a NPA-xxx-yyyy number designated for the determined PSAP. For instance, the call taker at the call center 104 then dials 1-900-xxx-yyyy, a designated number for that PSAP 118, and prepares to conduct a conference call with the caller 101 and the PSAP 118.

The call is then routed, via the PSTN 110, to a designated VoIP call server 112 (alternatively referred to as a media gateway). The media gateway and the VoIP call server may be two distinct functions co-located in the same unit, as in the present embodiment. The media gateway converts TDM to IP. The VoIP call server routes the resulting IP calls much like a traditional telephone switch routes a TDM call.

The VoIP call server 112 receives the ANI (caller ID) of the call center. The VoIP media gateway 112 reformats the call from time division multiplex (TDM) or code division multiplexed (CDM) into session initiation protocol (SIP). The VoIP Call Server rearranges the dialed digits, putting the DID that was dialed in step iii (e.g., 1-900-xxx-yyyy) in the FROM field and putting the ANI of the call center into the Just-in-Time callback number (JIT CBN) field within the P-Asserted Identity in the SIP Invite. (Session initiation protocol (SIP) is an IP-based protocol defined in IETF RFCs 3261 and 2543, the entirety of which are expressly incorporated herein by reference. SIP is one of two dominant messaging protocols used by the VoIP industry.

Importantly, the VoIP Media Gateway/call server 112 converts the TDM or CDM protocol of the incoming switched network phone call to packet data using session initiation protocol (SIP), and vice versa, meaning that packetized VoIP information coming from a relevant PSAP is converted into a switched connection with the 911 caller, terminated at the VoIP call server 112.

In step 5, the VoIP call server 112 forwards the 911 call to the VPC 130 as a VoIP call. The Invite is received by the VPC 130 for call routing instructions.

The VPC 130 is an application that determines the appropriate PSAP, based on the location of the 911 caller 101, returns associated routing instructions to the VoIP network, and provides the call center's identity and the callback number to the PSAP through the automatic location identification (ALI). (An ALI is a database that relates a specific telephone number to an address. This database accepts a PSAP query with a telephone number and responds with an address. In the case of an ESQK, the ALI database steers (redirects) the query to the appropriate VoIP positioning center and steers the response back to the querying PSAP).

A SIP Invite command may be used for the query from the Call Server 112 to the VPC 130. The disclosed SIP Invite command preferably includes the following parameters:
 a) The "from" field
  =the dialed digits from the call center (NPA-xxx-yyyy)
 b) The "to" field
  =911
 c) The JIT CBN field
  =callback number of the call center In step 6, the VoIP positioning center 132 queries an ERDB (SLDB) 134 for call routing instructions based upon the dialed NPA-xxx-yyyy number. The ERDB 134 relates the dialed number to the address of that phone number (lat/lon of the PSAP jurisdictional centroid) and determines the appropriate PSAP to receive the call. Within the ERDB 134, each phone number corresponds to a different PSAP.

In step 7, the ERDB 134 responds to the VPC 130 with the identity of the appropriate PSAP to serve the caller 101. The VPC 130 assigns an ESQK and emergency services routing number (ESRN) to the call and stages an ALI record. The ESRN is a 10-digit number that specifies the selective router to be used to route a call. The ALI record contains the phone number of the call center 104, based upon the ANI that accompanied the call. If the call center 104 is capable of sending the ANI of the actual end user, then this can be staged in the VPC ALI record.

Further call processing is otherwise per the conventional NENA i2 VoIP standard:

For instance, in step 8, the VoIP positioning center 130 assigns an emergency services query key (ESQK) appropriate to that PSAP, and stages a record with the call center call back number (CBN) and call center company ID.

The VoIP positioning center 130 responds to the VoIP call server 112 with the ESQK, emergency services routing number (ESRN), and last routing option (LRO). (The LRO is routing information sent by the VPC 130 that provides a "last chance" destination for a call, for example the contingency routing number (CRN) or a routing number associated with a national call center.

In step 9, the VoIP call server 112 uses the ESRN to route the call to the correct emergency services gateway (ESGW) 114.

The VoIP call server 112 uses the received ESRN to determine the appropriate ESGW 114 and routes the call appropriately to the correct emergency services gateway (ESGW) 114. The ESGW 114 uses the ESRN to determine the appropriate selective router 116. For simplicity and clarity of description, only one ESGW 114 and one selective router 116 are pictured in FIG. 2.

In step 10, the ESGW 114 performs media conversion by converting the SIP protocol (and vice versa in the opposite communication direction), and uses the ESRN to route the call to the correct selective router 116, along with the ESQK.)

In step 11, the selective router 116 routes the ESQK to the PSAP 118.

In step 12, the PSAP 118 queries the automatic location identification (ALI) database 120 using the ESQK.

In step 13, the ALI database 120 steers the query to the VoIP positioning center (VPC) 130, per previously provisioned steering tables. The VPC 130 responds with a staged record that includes the callback number (CBN) and call center company ID. In the preferred embodiments, no latitude/longitude (lat/lon) is sent in the ALI record, although such data could be forwarded if it is available.

In step 14, the ALI database 120 forwards the callback number (CBN) and call center ID to the requesting PSAP 118.

Figure 4:
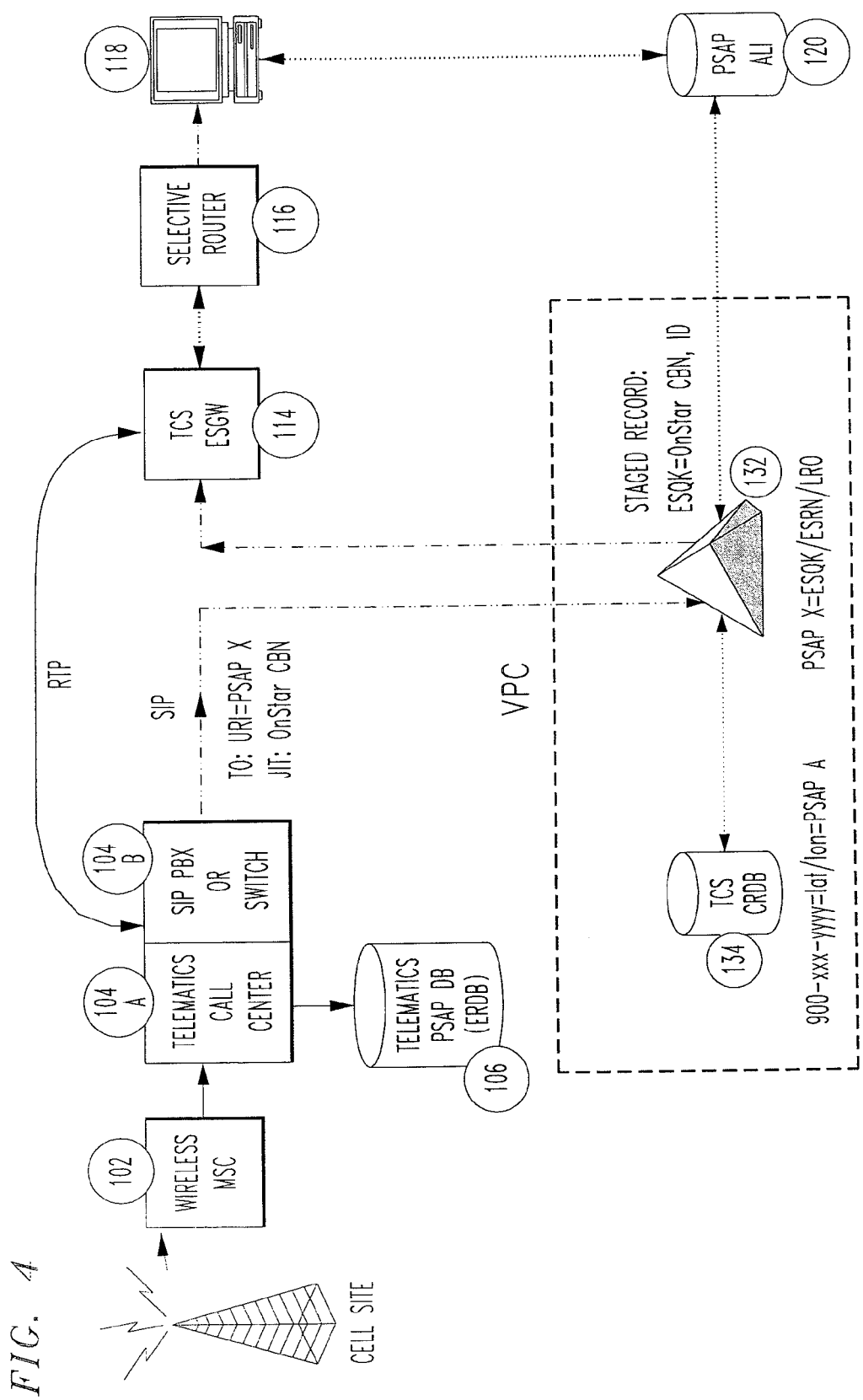
FIG. 4 depicts another embodiment showing the use of SIP messaging in lieu of the PSTN for passing an E911 call from a call center, in accordance with the principles of the present invention.

FIG. 4 depicts another embodiment showing the use of SIP messaging in lieu of the PSTN for passing an E911 call from a call center, in accordance with the principles of the present invention.

In particular, according to the embodiment shown in FIG. 4, in the event that a telematics call center has VoIP capability, the PSTN 110 may be eschewed by routing the telematics E911 call directly via VoIP between the call center 104 and the VPC 132.

As seen in FIG. 4, the PSTN of FIG. 1 is eliminated from the call flow. In this embodiment, each PSAP is assigned a designated 10-digit number that is provisioned in the telematics PSAP database 106. However, unlike the embodiment of FIG. 1, these 10-digit numbers need not be dialable via the PSTN. Instead, they can be assigned by the participating entities without regard to what numbers may be in use by other parties that use the PSTN. In fact, they do not necessarily need to be 10-digit numbers at all. Because they never see the light of day and remain at all times internal to the telematics vendor and the VPC, these PSAP-identifiers can be any mutually compatible predetermined format.

To accomplish this, the telematics call center includes what would otherwise be included at the telematics call center 104 shown in FIG. 1, but additionally a session initiation protocol (SIP) private branch exchange (PBX) or telephone switch 104B.

Figure 5:
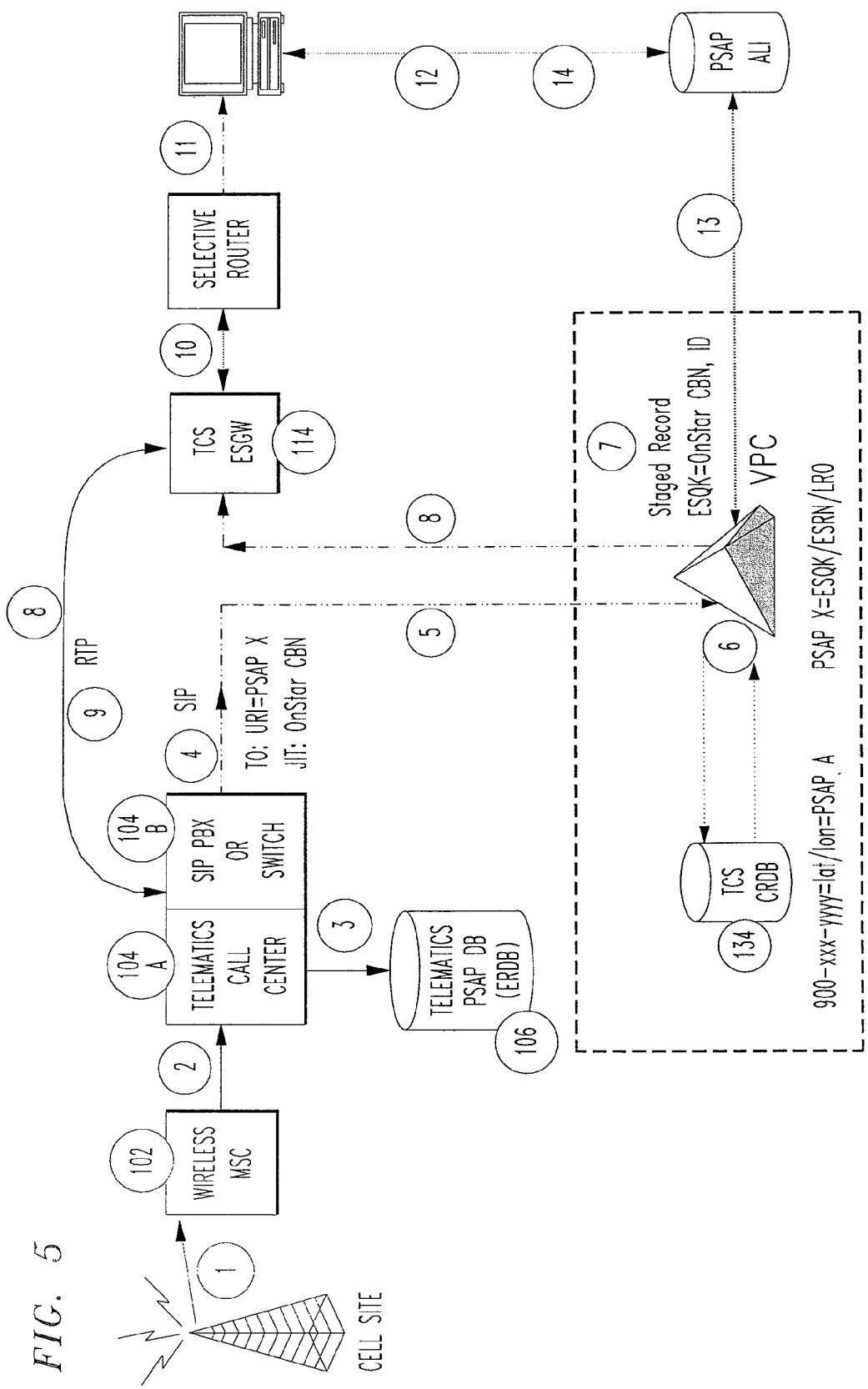
FIG. 5 shows message flow for the embodiment shown in FIG. 4.

FIG. 5 shows message flow for the embodiment shown in FIG. 4.

In particular, as shown in step 1 of FIG. 5, a cell site picks up and relays a 911 call made from a wireless subscriber to the carrier's wireless mobile switching center (MSC) 102.

In step 2, the wireless MSC 102 passes the wireless 911 call to the telematics call center 104A, which in this embodiment is associated with a SIP PBX or voice over Internet protocol (VoIP) switch 104B.

As shown in step 3, upon receipt of the 911 call, the call taker at the telematics call center 104B accesses the local telematics PSAP database 106 to determine routing (as otherwise shown and described with respect to the embodiment of FIGS. 1 and 2).

In response, the telematics PSAP database 106 provides a designated PSAP number for that PSAP that need not be a 10-digit number that is dialable on the PSTN.

As shown in FIG. 4, the telematics call taker dials the designated PSAP number and initiates a conference call, or transfers the call. However, when the telematics call taker dials the designated PSAP number, the integrated telematics VoIP switch 104B translates the designated PSAP number into a specific SIP message.

The VoIP switch initiates a SIP INVITE message in which the "TO" address is a universal resource indicator (URI) address equal to a specific mailbox at the VoIP positioning center (VPC) 132 reserved for the PSAP designated by the original designated PSAP number. The "Just in time Call back Number" (JITCBN) is preferably provisioned to be the PSTN-dialable phone number of the telematics call taker at the telematics call center 104A.

In step 5, the SIP INVITE message is passed to the VoIP positioning center 132.

In steps 6-8, the VPC 132 selects an ESQK, ESRN and LRO appropriate to the PSAP designated in the SIP INVITE message, and will establish RTP between the SIP switch 104B and the ESGW 114 indicated by the selected ESRN.

In step 9, a voice path is established via Internet Protocol (IP) between the VoIP switch 104B and the ESGW 114.

As is otherwise described herein with respect to the embodiment of FIGS. 1 and 2, the ESGW 114 performs media conversion from Internet Protocol (IP) to time division multiplexing (TDM).

In step 10, the ESGW 114 routes the call in TDM format to the designated selective router 116 according to the ESRN or the ESQK.

In step 11, the selective router 116 determines the destination PSAP based upon the ESQK, and routes the call to the PSAP 118 per existing technology.

As in the embodiments described above, the VPC 132 stages an ALI record when it responds to the SIP INVITE. This record consists of the assigned ESQK, plus the call back number (CBN) received in the JITCBN field of the SIP INVITE message, plus other data as available and as desired by the PSAP 118, e.g., NENA ID, lat/lon, etc.

In step 12, upon receipt of the call, the PSAP 118 initiates a standard query to the ALI database 120 per existing technology.

In step 13, the ALI database 120 routes that query from the PSAP 118 to the VPC 132 per otherwise existing technology.

In step 14, the VPC responds to the ALI query with the staged record, including a callback number and other data as desired by the PSAP 118.

In accordance with the present invention, benefits are derived by routing 911 calls via the Enhanced E911 network. Moreover, PSAPs can utilize all available technologies available to them in an Enhanced E911 network such as CAD, selective transfer, etc. when responding to a call from a telematics or other call center.

The present invention makes possible the transfer of misrouted or defaulted VoIP calls from a VoIP default call center to the appropriate PSAP via the Enhanced E911 network. In conventional systems defaulted calls must be routed via the PSTN.

This invention saves taxpayers money by allowing PSAPs to discontinue designated PSTN lines. This invention also increases the speed with which emergency services (responders) can be dispatched and provides recorded documentation of conversations that are typically available on calls received via the E911 network, but not via the PSTN.

The present invention has particular relevance for use by any alarm monitoring company, telematics call center, or emergency call center that monitors incoming calls. The invention has significant benefit in the use by automotive roadside assistance call centers like OnStar™, TeleAid, etc.

While the invention has been described with reference to the exemplary embodiments thereof, those skilled in the art will be able to make various modifications to the described embodiments of the invention without departing from the true spirit and scope of the invention.

What is claimed is:

1. A method of providing a call center with access to a public safety answering point (PSAP), comprising:
   receiving, at a telematics call center, a switched telematics call center telephone call; and
   converting said switched telematics call center telephone call into an Internet Protocol (IP) based packetized telematics call center telephone call;
   wherein said converted IP based packetized telematics call center telephone call is routed directly from said telematics call center to a PSAP having jurisdictional responsibility for a physical location associated with a switched telephone device associated with said switched telematics call center telephone call.

2. The method of providing a call center with access to a public safety answering point (PSAP) according to claim 1, further comprising:
   providing a designated session initiation protocol (SIP) Uniform Resource Identifier (URI) not consisting of a 10-digit phone number.

3. The method of providing a call center with access to a public safety answering point (PSAP) according to claim 1, further comprising:
   querying a Voice-over-Internet-Protocol (VoIP) positioning center for call routing instructions for said converted IP based packetized telematics call center phone call.

4. The method of providing a call center with access to a public safety answering point (PSAP) according to claim 1, wherein:
   said telematics call center is a wireless telematics call center.

5. The method of providing a call center with access to a public safety answering point (PSAP) according to claim 1, wherein:
   said telematics call center is an alarm monitoring center.

6. The method of providing a call center with access to a public safety answering point (PSAP) according to claim 1, wherein:
   said converting is performed at said telematics call center.

7. The method of providing a call center with access to a public safety answering point (PSAP) according to claim 1, further comprising:
   querying a Voice-over-Internet-Protocol (VoIP) positioning center from said telematics call center.

8. The method of providing a call center with access to a public safety answering point (PSAP) according to claim 1, further comprising:

providing a designated number for said PSAP, said designated number not consisting of a 10-digit phone number.

9. The method of providing a call center with access to a public safety answering point (PSAP) according to claim 1, further comprising:
   transmitting a call-back number and said physical location to said PSAP.

10. The method of providing a call center with access to a public safety answering point (PSAP) according to claim 1, further comprising:
   staging, via a Voice-over-Internet-Protocol (VoIP) positioning center, a call-back number and said physical location in an automatic location identification (ALI) database.

11. The method of providing a call center with access to a public safety answering point (PSAP) according to claim 1, further comprising:
   providing said physical location to a Voice-over-Internet-Protocol (VoIP) positioning center.

12. The method of providing a call center with access to a public safety answering point (PSAP) according to claim 11, wherein:
   providing said physical location to said VoIP positioning center via a non-call path data link to said telematics call center.

13. The method of providing a call center with access to a public safety answering point (PSAP) according to claim 11, further comprising:
   providing a callback number to said VoIP positioning center.

14. The method of providing a call center with access to a public safety answering point (PSAP) according to claim 1, further comprising:
   providing a callback number associated with said telematics center via standard call set-up procedures across a public switched telephone network (PSTN), to a call server.

\* \* \* \* \*